United States Patent [19]

Prusak et al.

[11] 4,414,167
[45] Nov. 8, 1983

[54] METHOD FOR MOLDING AN ARTICLE

[75] Inventors: John J. Prusak; Bhupendra P. Patel, both of Indianapolis, Ind.

[73] Assignee: RCA Corporation, New York, N.Y.

[21] Appl. No.: 350,087

[22] Filed: Feb. 18, 1982

[51] Int. Cl.$^3$ .............................................. B29F 1/06
[52] U.S. Cl. .................................. 264/40.5; 264/106; 425/149; 425/810
[58] Field of Search ................... 264/328.7, 106, 40.5; 425/DIG. 810, 149; 100/269 R

[56] References Cited

U.S. PATENT DOCUMENTS

| | | | |
|---|---|---|---|
| 1,183,427 | 5/1916 | Brown | 264/328.7 |
| 3,568,592 | 3/1971 | Harvanek | 100/269 R |
| 3,947,203 | 3/1976 | Rose | 425/245 R |
| 4,096,218 | 6/1978 | Yasuike et al. | 264/45.5 |
| 4,281,816 | 8/1981 | Carroll et al. | 249/82 |

Primary Examiner—Donald E. Czaja
Assistant Examiner—James C. Housel
Attorney, Agent, or Firm—Birgit E. Morris; Donald S. Cohen

[57] ABSTRACT

A method for molding an article, such as a preform, used in making information recorded discs, includes use of top and bottom mold members having recesses in their approved surfaces. The top mold member is mounted on the end of the piston rod of a pneumatic cylinder which is adapted to move the top mold member into mating relation with the bottom mold member so that the mold recesses form a mold cavity. The bottom mold member includes means for injecting a plastic mold material into the mold cavity. To mold a preform, the top mold member is moved by the pneumatic cylinder toward the bottom mold member to a collapsed position of the mold members where the mold cavity is of a volume less than the desired volume of the preform being molded. Plastic mold material is injected into the mold cavity until it is filled and additional mold material is injected into the mold forcing the top mold member away from the bottom mold member until the cavity is of the desired volume of the preform. The pneumatic cylinder is connected to an air reservoir so that when the top mold member is moved against the pressure of the pneumatic cylinder the air therein is forced into the air reservoir so as to maintain a substantially uniform, and preferably relatively low, pressure on the article being molded.

2 Claims, 2 Drawing Figures

METHOD FOR MOLDING AN ARTICLE

BACKGROUND OF THE INVENTION

The present invention relates to a method and apparatus for molding an article, such as a preform, which is used for making an information recorded disc, and particularly to such a method and apparatus which makes a preform which forms a disc having reduced voids and blisters in its surfaces.

Compression molded recorded discs are generally made by forming a preform of thermoplastic material and placing the preform centrally between a pair of heated molds. The molds are closed against the preform, melting the thermoplastic and compressing it, causing it to flow outwardly to fill the mold cavity and define the record contour. In molding the disc, it is highly desirable to prevent, or at least minimize, surface defects, such as voids and blisters caused by trapped air and gases, which can disrupt the surface relief pattern in the surface of the disc. The prevention of such surface defects is more desirable in making high density information discs, such as video discs, which utilize very high packing densities of the surface relief pattern, since even the smallest void or blister can disrupt a significant portion of the pattern.

An apparatus which will mold suitable preforms is described in U.S. Pat. No. 4,281,816 to Charles B. Carrol et al, entitled "Automatic Apparatus for Molding a Preform" issued Aug. 4, 1981, which is incorporated herein by reference. This apparatus includes a mold cup having opposed top and bottom mold members and a carrier arm between the mold members. The mold members have cooperating opposed recesses which, along with the carrier arm, mate to form a mold cavity. The bottom mold member has an opening therethrough through which the plastic mold material is admitted into the mold cavity. Pneumatic cylinders have piston rods which are connected to the mold members and the carrier arm for moving the mold members toward and away from each other and the carrier arm transversely across and away from the mold members.

In forming a preform with this apparatus, the mold members are moved together to a collapsed mold position in which the bottom mold member fits within the top mold member so that the mold cavity is of a volume smaller than the desired volume of the preform being molded. The plastic mold material is injected into the collapsed mold cavity to the bottom mold member until the mold cavity is filled. The injection of the plastic mold material is continued causing the top mold member to move away from the bottom mold member so as to expand the volume of the mold cavity until the mold cavity is of the desired volume. The injection of the plastic mold material into the mold cavity is then stopped. The mold members are then separated to permit removal of the molded preform by the carrier member.

In order to cause the movement of the top mold member so as to expand the volume of the mold cavity, the force applied by the continued injection of the plastic mold material must be greater than the force applied by the hydraulic cylinder attached to the top mold member. This force determines the density and shape of the preform which in turn determines whether the disc formed from the preform contains any surface voids and blisters. It has been found that with the apparatus shown in the Carroll et al patent the force applied to the preform builds up to a relatively high value, about 50 psi, and that the resulting preform causes an undesirable amount of blisters and voids in the surfaces of the disc made therefrom.

SUMMARY OF THE INVENTION

A preform is molded in a mold which includes at least two mold members having opposed recesses which are adapted to mate to form a mold cavity. The mold members are movable toward each other to a collapsed position in which the mold cavity is of a volume less than the desired volume and away from each other to an expanded position in which the mold cavity is of the desired volume. With the mold members being in the collapsed position a plastic mold material is injected into the mold cavity until the cavity is filled with the material. The injection of the mold material into the cavity is continued so that the mold material moves the mold members apart to the expanded position of the mold members. The mold is provided with means whereby while the mold members are being moved from the collapsed position to the expanded position, a substantially uniform pressure is maintained on the mold material in the cavity.

DETAILED DESCRIPTION OF THE INVENTION

Figures 1, 2:
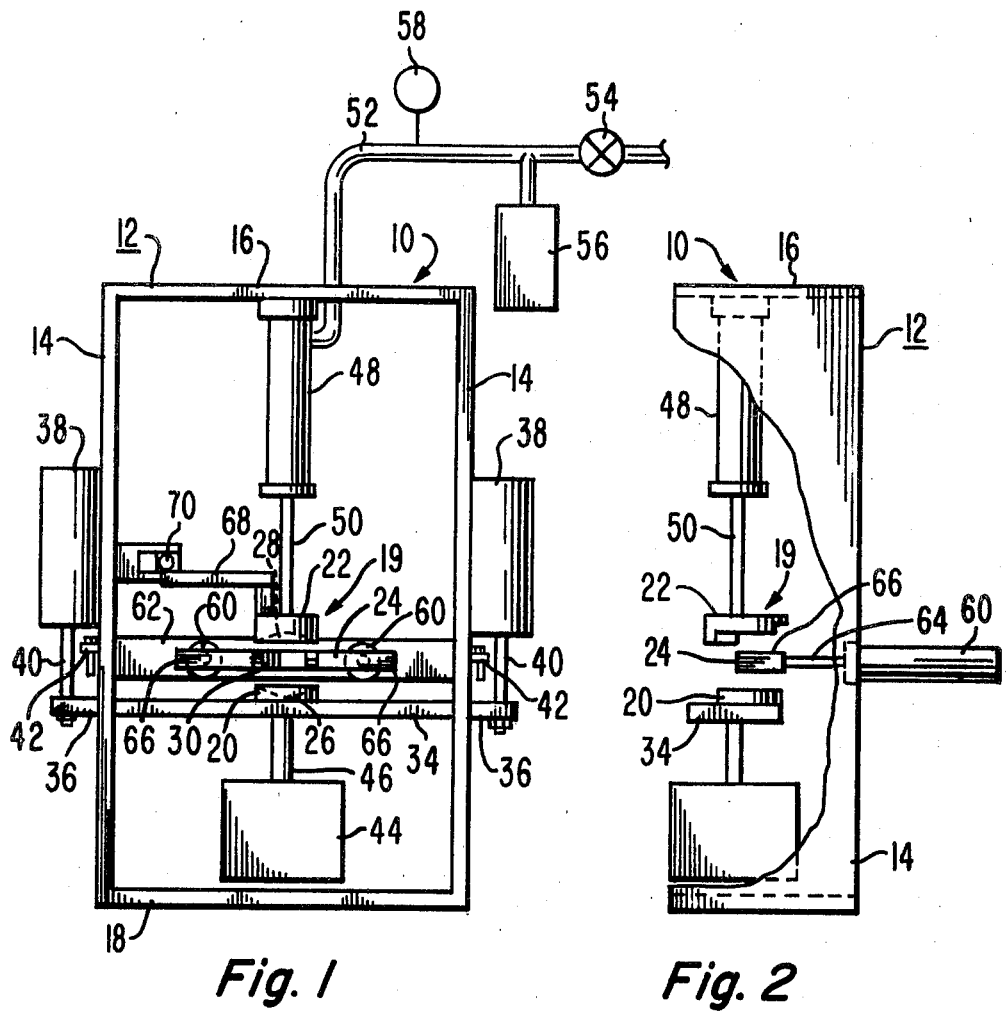
FIG. 1 is a front elevational view of a preform molding apparatus incorporating the present invention.
FIG. 2 is a side elevational view, partially broken away, of the molding apparatus shown in FIG. 1.

Referring to FIG. 1, a preform molding apparatus which incorporates the present invention is generally designated as 10. The molding apparatus 10 includes a support frame 12 having vertical side rails 14 connected together at their ends by horizontal top and bottom rails 16 and 18. The frame 12 supports a mold cup, generally designated as 19. The mold cup 19 includes a bottom mold member 20, a top mold member 22 and a carrier arm 24 between the bottom and top mold members 20 and 22. The details of the construction of the parts of the mold cup 19 are not a part of the present invention and are described in detail in previously referred to U.S. Pat. No. 4,281,816. However, the bottom and top mold members 20 and 22 have recesses 26 and 28 respectively in their opposed surfaces and the carrier arm 24 has a semi-cylindrical opening 30 at its front edge. The bottom and top mold members 20 and 22 are adapted to mate within the opening 30 in the carrier arm 24 so as to form a mold cavity.

The bottom mold member 20 is mounted on a support plate 34 which extends horizontally between the side rails 14 of the support frame 12. The support plate 34 has arms 36 extending from its ends and projecting through openings in the side rails 14. A separate pneumatic cylinder 38 is secured to each of the side rails 14 of the support frame 12 above the support plate 34. The cylinders 38 are vertically positioned and each has a piston rod 40 extending downwardly therefrom and connected at its end to a separate one of the arms 36 of the support plate 34. The pneumatic cylinders 38 are each of the type which will normally pull the support plate 34 upwardly. On each side of the rails 14 above the support plate 34 is an adjustable stop 42 against which the arms 36 of the support plate 34 are held by the action of the pneumatic cylinders 38.

A plastic extruder 44 is mounted below the support plate 34 and has an exit pipe 46 extending upwardly toward the support plate 34. On the end of the exit pipe 46 is a nozzle (not shown) which extends through an opening in the support plate 34 and has a slidable but true fit in an opening in the bottom of the bottom mold member 20.

A pneumatic cylinder 48 is secured at one end to the top rail 16 and extends vertically downwardly therefrom. A piston rod 50 extends vertically downwardly from the cylinder 48. The top mold member 22 is secured to the end of the piston rod 50. The air inlet end of the pneumatic cylinder 48 is connected by a pipe 52 to a source of air under pressure, not shown. A valve 54 is provided in the pipe 52 to control the pressure of the air supply to the air cylinder 48. The valve 54 is a one-way valve which allows air to flow from the source to the pneumatic cylinder 48 but prevents the reverse flow. An air reservoir 56 is connected into the pipe 52 between the valve 54 and the pneumatic cylinder 48. An air gage 58 is connected to the pipe 52 to provide an indication of the pressure of the air being provided to the air cylinder 48.

A pair of spaced, parallel, pneumatic cylinders 60 are mounted on a support plate 62 which is mounted between the side rails 14 of the support frame 12. The pneumatic cylinders 60 extend along lines perpendicular to the pneumatic cylinder 48. Piston rods 64 extend from the cylinder 60 and the ends of the piston rods 64 extend through and are secured to the mounting arms 66 which project from the sides of the carrier arm 24. Thus, the carrier arm 24 is supported on the piston rods 64 and is adapted to be moved by the piston rods 64 along a path between and transversely across the top and bottom mold members 22 and 20.

To mold a preform in the molding apparatus 10, the cylinders 38 are actuated to hold the support plate 34 upwardly against the stops 42. The stops are adjusted so that the bottom mold member 20 is positioned with the end of the nozzle on the exit pipe 46 being flush with the bottom of the mold recess 26 and with the bottom mold member 20 being seated against the bottom surface of the carrier arm 24.

The pneumatic cylinder 48 is then actuated to lower the top mold member 22 onto the carrier arm 24 and the bottom mold member 20. As described in U.S. Pat. No. 4,281,816, the mold members 20 and 22 are designed so that they can be brought together to a collapsed position in which the bottom mold member 20 fits within the top mold member 22 and the mold recesses 26 and 28 form a mold cavity which is smaller in volume than the volume of the reform being molded. With the mold members 20 and 22 being in their collapsed position, the extruder 44 is turned on to extrude plastic material into the cavity formed by the mold recesses 26 and 28. When the collapsed mold cavity is completely filled with the plastic material, the injection of the plastic material is continued to force additional plastic material into the mold cavity. The injection of the additional plastic material applies pressure to the top mold member 22 which forces the top mold member 22 upwardly until the mold cavity is of a volume of the preform being molded. A flag 68 is mounted on the top mold member 22 and is positioned to extend across a proximity switch 70 mounted on a side rail 14. The flag 68 and switch 70 are positioned such that when the top mold member 22 reaches the expanded position of the mold members, where the mold cavity is of the desired volume, the flag 68 extends across the switch 70 causing the switch to be actuated to turn off the extruder 44.

As the plastic material enters the mold cavity formed by the mold recesses 26 and 28, the surface of the plastic material will harden when it contacts the surfaces of the mold members which are at a lower temperature than the plastic material. When the mold members 20 and 22 are in their expanded position and the mold cavity is completely filled with the plastic material, the cylinder 48 is actuated to lift the top mold member 22 upwardly and the cylinders 38 are actuated to lower the bottom mold member 20. In this open position of the mold cup 12, the bottom and top mold members 20 and 22 are now spaced from the molded preform which is mechanically secured to the carrier arm 24. The pneumatic cylinders 60 are then actuated to move the carrier arm 24 transversely across the bottom and top mold members 20 and 22 and carry the preform to an adjacent mold press.

When the additional plastic material is injected into the mold cavity to cause the top mold member 22 to move to the expanded position of the mold members, the pressure applied to the plastic material in the mold cavity is that necessary to overcome the pressure applied by the air in the pneumatic cylinder 48. In the apparatus 10, the upward movement of the top mold member 22 causes the air in the pneumatic cylinder 48 to flow back through the pipe 52 into the air reservoir 56. Thus, instead of the pressure on the air in the cylinder 48 building up causing a continuously increasing pressure on the plastic in the mold cavity, the air in the cylinder 48 flows into the air reservoir 56 providing a substantially uniform pressure on the plastic material in the mold cavity. By maintaining a substantially uniform pressure on the material in the mold cavity, the pressure can be controlled to a desired pressure, particularly a relatively low pressure, by providing an air reservoir 56 of a particular volume compared with the volume of the pneumatic cylinder 48. Thus, the apparatus 10 will provide a substantially uniform pressure on the preform being formed and this pressure can be controlled to be relatively low. It has been found that by providing a relatively low pressure on the preform the resulting preform will mold a recorded disc having fewer surface voids and blisters.

The following table shows the results of molding recorded discs from preforms molded at different pressures.

| PRESSURE (psi) | NO. OF DISCS MOLDED | No. OF DISCS WITH SURFACE DEFECTS | % REJECTS |
| --- | --- | --- | --- |
| 55 | 200 | 200 | 100 |
| 40 | 9000 | 2097 | 23.2 |
| 40 | 7380 | 1369 | 18 |
| 30 | 5875 | 352 | 6 |
| 20 | 1229 | 140 | 11 |

As can be seen from the above table, recorded discs molded from preforms formed at pressures no greater than 30 psi had considerably fewer surface defects in the form of blisters and the like than the records molded from preforms formed at higher pressures. With a hydraulic cylinder 48 of a volume of 16.5 in$^3$ (271.5 cc), an air reservoir 150 in$^3$ (2460 cc) in volume will provide a pressure of 25 psi. Thus, the method and apparatus of the present invention provides for forming preforms at uniform pressures which can be maintained relatively low to achieve molded discs having fewer surface defects.

Although the present invention has been described as being used to mold a preform for making molded recorded discs, it should be understood that it can be used to make any type of molded article where it is desirable to be able to control the density of the article being molded.

We claim:

1. A method of molding an article in a mold which includes at least two mold members having opposed recesses which are adapted to mate to form a mold cavity, a pneumatic cylinder for moving the mold members toward each other to a collapsed position in which the mold cavity is of a volume less than the desired volume of the article and away from each other to an expanded position in which the mold cavity is of the desired volume of the article, a pipe connecting the pneumatic cylinder to a source of air under pressure, valve means connected to said pipe for allowing air to flow from the source to the pneumatic cylinder but preventing the flow of air from the pneumatic cylinder to the source, and an enclosed air reservoir connected to the pipe between the pbneumatic cylinder and the valve means, said method comprising injecting a plastic mold material into the mold cavity with said mold cavity being in the collapsed position until the cavity is filled with said material, continuing to inject additional mold material into the cavity so that the mold material moves the mold members apart to the expanded position of the mold member against the pressure of the pneumatic cylinder which applies pressure on the mold material, and maintaining substantially uniform pressure on the mold material in the cavity while the mold members are being moved from the collapsed position to the expanded position solely by allowing the air in the pneumatic cylinder to expand into the enclosed air reservoir.

2. A method in accordance with claim 1 wherein the pressure maintained on the mold material while the mold members are moved from their collapsed position to their expanded position is no greater than about 30 psi.

* * * * *